(12) United States Patent
Fisher

(10) Patent No.: US 7,134,140 B2
(45) Date of Patent: Nov. 7, 2006

(54) TOKEN-BASED AUTHENTICATION FOR NETWORK CONNECTION

(75) Inventor: Lee Adam Fisher, Aylesbury (GB)

(73) Assignee: McAfee, Inc., Santa Clara, CA (US)

( * ) Notice: Subject to any disclaimer, the term of this patent is extended or adjusted under 35 U.S.C. 154(b) by 1038 days.

(21) Appl. No.: 09/963,811

(22) Filed: Sep. 27, 2001

(65) Prior Publication Data

US 2003/0061509 A1 Mar. 27, 2003

(51) Int. Cl.
*G06F 15/16* (2006.01)
*G06F 11/30* (2006.01)
*H04L 9/00* (2006.01)

(52) U.S. Cl. .............................. 726/9; 726/14; 709/245
(58) Field of Classification Search ..................... None
See application file for complete search history.

(56) References Cited

U.S. PATENT DOCUMENTS

| | | | |
|---|---|---|---|
| H001944 H * | 2/2001 | Cheswick et al. ............. | 726/11 |
| 6,445,682 B1 * | 9/2002 | Weitz ........................... | 370/257 |
| 6,564,216 B1 * | 5/2003 | Waters ......................... | 707/10 |
| 6,651,092 B1 * | 11/2003 | Muraoka ..................... | 709/220 |
| 6,654,891 B1 * | 11/2003 | Borsato et al. ............... | 726/6 |
| 6,697,864 B1 * | 2/2004 | Demirtjis et al. ........... | 709/229 |
| 6,704,789 B1 * | 3/2004 | Ala-Laurila et al. ........ | 709/230 |
| 6,754,712 B1 * | 6/2004 | Valencia ..................... | 709/227 |
| 6,799,204 B1 * | 9/2004 | Baba et al. .................. | 709/220 |
| 6,996,621 B1 * | 2/2006 | Borella et al. .............. | 709/228 |

\* cited by examiner

*Primary Examiner*—Christopher Revak
(74) *Attorney, Agent, or Firm*—Zilka-Kotab, PC; Christopher J. Hamaty

(57) ABSTRACT

A token based system for authenticating a client computer when it connects to a network. An address is requested from a server connected to the network. Provision of the address by the server triggers the server to look for a token on the client computer. If no token is found steps, such as revoking the address, can be taken. This enables a system administrator to control what machines can connect to the network, for example, it may allow only those having specified anti-virus software.

48 Claims, 4 Drawing Sheets

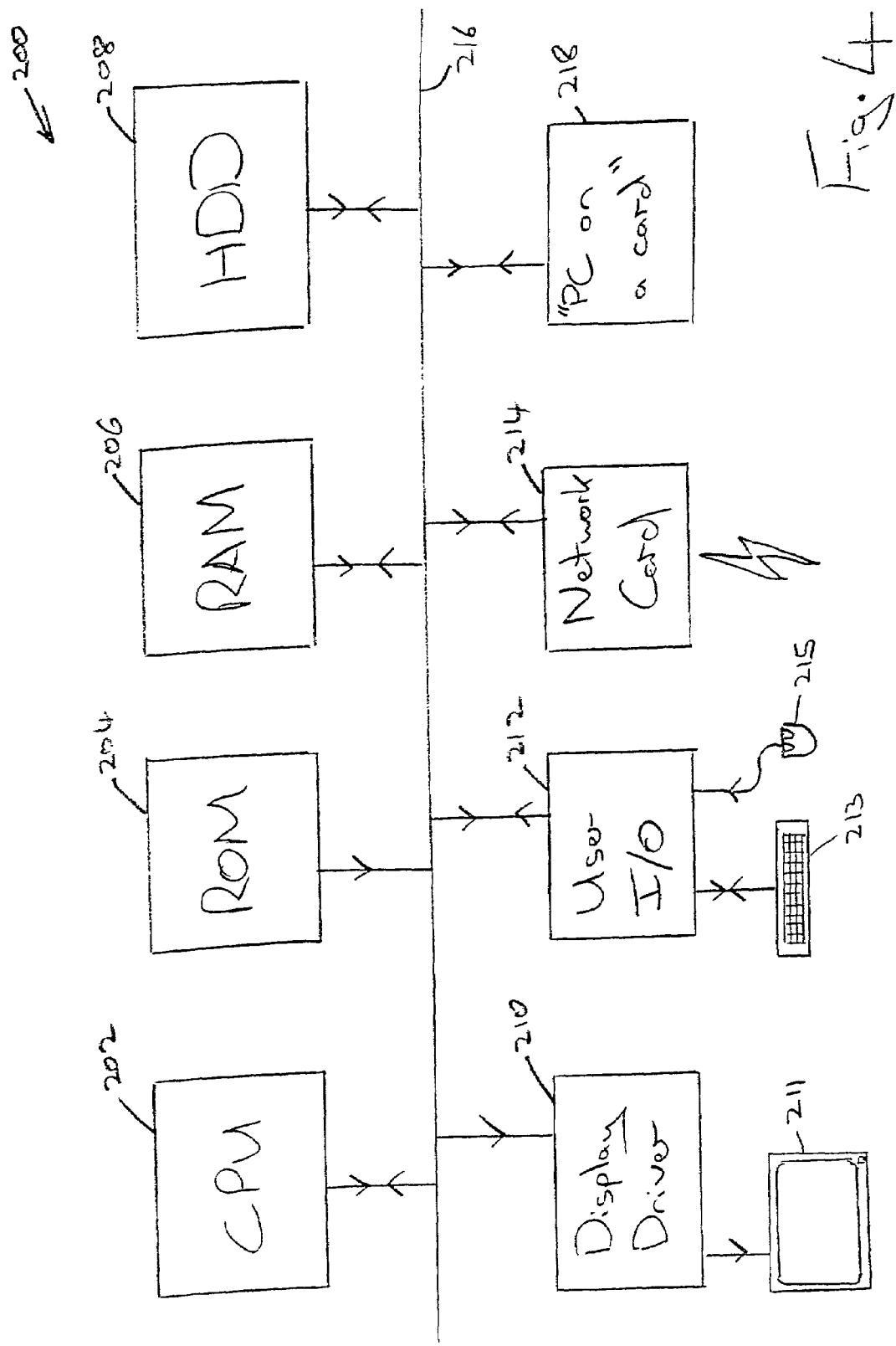

TOKEN-BASED AUTHENTICATION FOR NETWORK CONNECTION

BACKGROUND OF THE INVENTION

1. Field of the Invention

This invention relates to the field of data processing systems. More particularly, this invention relates to data processing systems in which a plurality of machines are connected together via a network.

2. Description of the Prior Art

In many known computer networks, a person wishing to connect to such a network makes a DHCP (dynamic host configuration protocol) request for an IP address to any of the network's DHCP servers. The DHCP server leases IP addresses to machines on demand. The IP address leased is based on the range that is configured within the DHCP server settings. For example, an IP address may be made up of four elements, three of the elements being used to represent a particular office location, so that the router can tell where the machine is, and the fourth element distinguishing the actual machine from the other machines. Thus, in this example there would potentially be 256 possible addresses per office. In reality, some of these addresses may be reserved and used exclusively for a particular task, a gateway (such as a router), for example, could always end in a .252 address and a DHCP server could always end with a .10 address. The remaining addresses are allocated on demand to machines wishing to connect to the network.

On receipt of an IP address request the DHCP server replies by asking the machine making the request its name. If it has a name corresponding to an IP address that no other machine is using at present, then the DHCP server gives this IP address back to the machine, if not, an unused addresses is allocated. The DHCP server leases these IP addresses and when a machine disconnects from the network, the address is "given back" to the DHCP server so that it can be allocated to another machine trying to connect to the network.

In this known system, the DHCP server does not make any check on the user credentials at the time of the request, the responsibility of authentication is left to the network operating systems.

A current process of authenticating a user within, for example, the Microsoft™ NT Networking design does not allow an administrator to validate "what or who" has access to the network, it rather controls access to network resources. For example, a third party consultant with a laptop computer can simply request an IP address from a DHCP server on the network, and be provided with an address based on the network location to which the request came. Of course, once an IP address has been provided to the consultant he/she can now attempt to 'logon' to the network in the traditional way. Our consultant may not know of a user account to authenticate to the network, and proceeds to connect to the network by logging into the laptop locally. Even though the consultant has no access to network resources he/she is still capable of 'sniffing' (packet capturing) data from the corporate network, and can also connect to resources which require 'null' access (null session shares etc.).

SUMMARY OF THE INVENTION

Viewed from one aspect the present invention provides, a computer program product comprising a computer program operable to control a server computer, said computer program comprising: (i) address provision logic operable to control said server computer to provide an address for accessing a network to a client computer, in response to a request for an address from said client computer; (ii) token validation logic operable in response to said provision of said address to control said server computer to contact said client computer at said address and to detect a presence of a predefined token on said client computer.

Thus, the provision of an address triggers the server computer to check for a token on the client computer. The server computer is therefore able to make a check on what or who is connected to the network at the point of address provision. This means that the network is able to perform machine validation, for example, at the initial point of contact between a machine and a network. This is an extremely powerful tool for providing network administrators with access control. Once an administrator knows that a new machine has connected to the network then something can be done about it. Finding unknown machines is a difficult and tedious task that otherwise would need to be undertaken often.

Preferably, said token validation logic is operable to control said server computer to check whether said detected predefined token is valid.

Thus, in addition to confirming the presence of a token, the properties of a token can be monitored to see if it is valid or not. Thus, information such as an expiry date or a version number can be carried on the token thereby providing more sophisticated access control.

In some embodiments, the token validation logic is operable to control said server computer to revoke said address from said client computer if said token is not detected or is not valid, alternatively or additionally said token validation logic is operable to control said server computer to record machine data from said client computer if said token is not detected and/or to signal to said client computer that access has been denied if said token is not detected.

The absence of a token on the client computer can trigger the server computer to perform different tasks. For example the address can be revoked, thereby preventing any further communication between the client computer and the network; machine data can be recorded from the client computer so that the network administrator can be made aware of the nature of the machine trying to connect to the network; and if access is to be denied, this can be signalled to the client computer.

In some embodiments, said predefined token indicates the presence of software allowing remote configuration of said client computer and in preferred embodiments if said token is not detected said token validation logic is operable to control said server computer to install said remote configuration software on said client computer.

The presence of such software allows the operator to standardise the configuration of the client computer to be compatible with network standards, for example, to have the required anti-virus software present on the machine. The ability to install such software if it is not present allows machines that would otherwise not be permitted to connect to the network, to be connected thereto.

In some embodiments, said predefined token indicates the presence of antivirus software on said client computer. The use of such a token enables a network to stop any machine not protected by anti-virus software from connecting to the network, or in other embodiments, it allows the operator to be notified of the presence of the machine.

In some embodiments, said server computer comprises a DHCP server and said address comprises an IP address.

In most network systems, any new machine wishing to connect to the network must request an IP address from a DHCP server, thus, by providing a DHCP server with a computer program product according to an embodiment of the invention any new machine wishing to access the network can be checked for the presence of a token.

In other embodiments, said address provision logic is operable to control said server computer to request an address from a further server computer and to provide said address to said client computer, preferably, said further server computer is a DHCP server and said address comprises an IP address.

Thus, a further server can act to intercept any address request by a client and it can make the request itself, pass on the address and perform a check for a token. This enables the token check to be performed without any change being made to any DHCP server.

The predefined token can comprise almost anything, for example, it may comprise a computer file or files, a smart card, or data identifying a hardware component of said client computer.

Further aspects of the present invention are set out in the appended claims.

The above, and other objects, features and advantages of this invention will be apparent from the following detailed description of illustrative embodiments which is to be read in connection with the accompanying drawings.

BRIEF DESCRIPTION OF THE DRAWINGS

FIG. 4 schematically illustrates a general purpose computer of a type that may be used for performing scanning operations.

FIG. 1 illustrates a computer network 2 including a DHCP server 4, a plurality of client computers 8, 10, 12 and a plurality of rack mounted appliance computers 14. A local area network 16 connects these computers.

FIG. 2 shows the process according to an embodiment of the invention that occurs when a client computer 8, 10, 12 of FIG. 1 requests connection to the network, by requesting an IP address from the DHCP server 4. On receipt of the request the DHCP server sends an IP address to the client computer. The sending of this address triggers software on the DHCP server to start a process whereby the client computer is accessed in order to look for the presence of a predefined token. This is done by a call to the ePO server service on the client computer. If the token is located then this triggers the process to end. If the token cannot be found, then the process acts to revoke the IP address and thus, access to the network is denied.

In other embodiments, in addition to locating the token, details of the token, such as an expiry date, or version number can be read and checked against stored data, so that the token can be validated.

Figure 1:
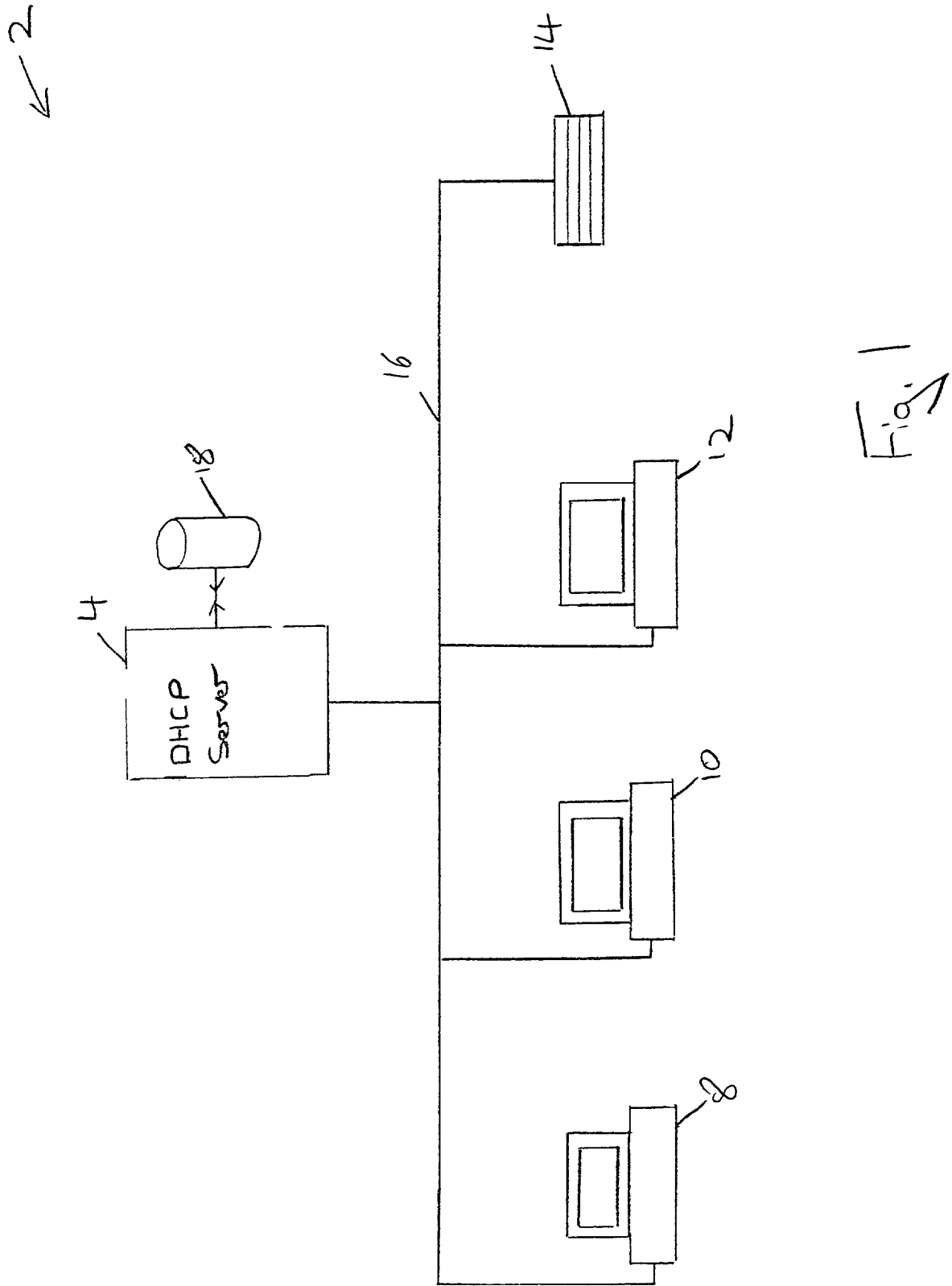
FIG. 1 schematically illustrates an example of a computer network.
Figure 2:
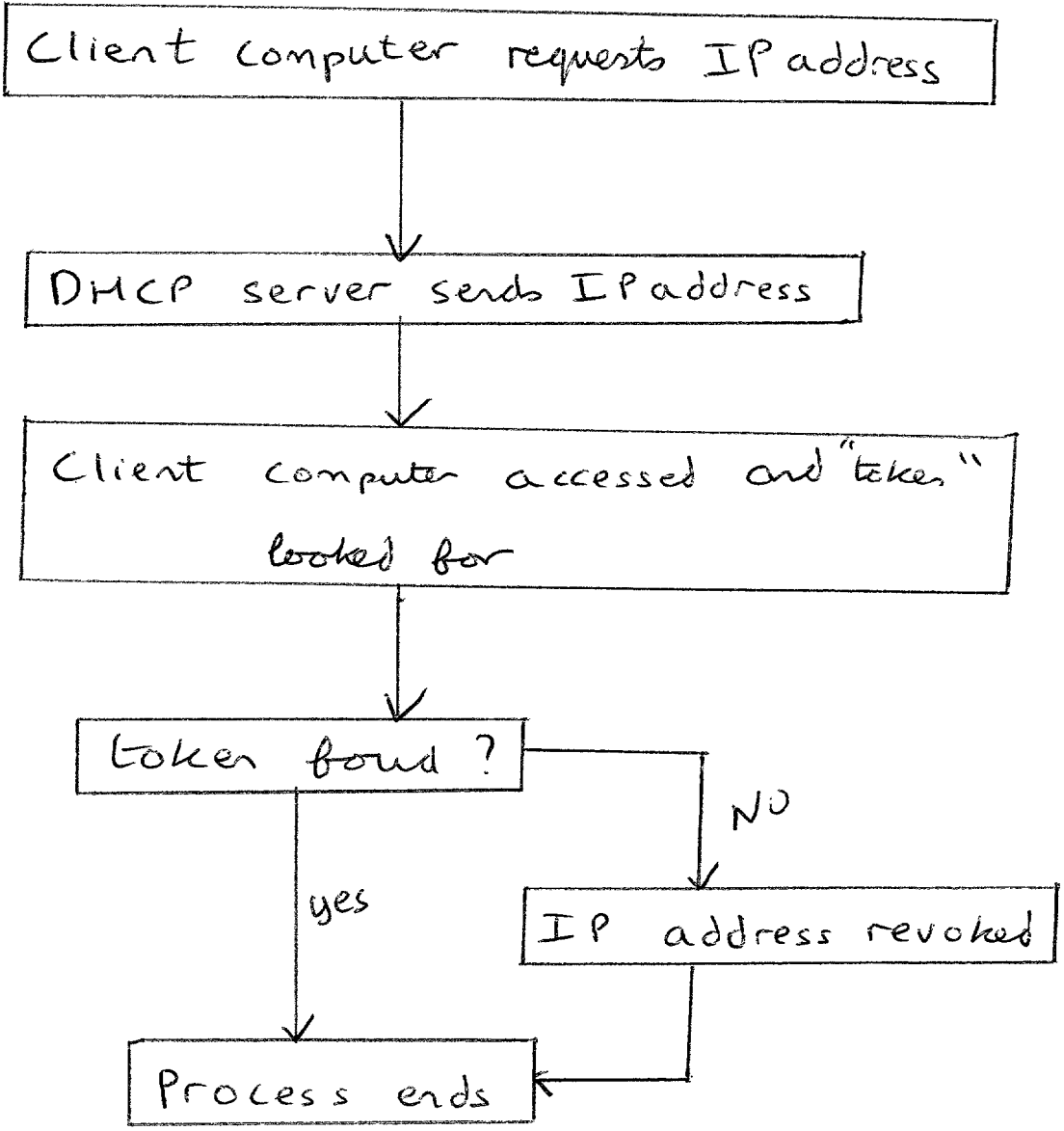
FIG. 2 is a flow diagram showing schematically the steps undertaken when a machine connects to a network according to an embodiment of the invention.

In the embodiment of FIG. 2 if the token is not found, then the IP address is revoked. If there is an additional verification step, to check predefined properties of the token, clearly the absence of at least some of these properties would also result in the revocation of the IP address. In other embodiments, the IP address need not be revoked in response to the token not being found or not being valid, instead and/or additionally, the details of the client machine may be recorded and notified to the system administrator or other specified steps may occur.

Figure 3:
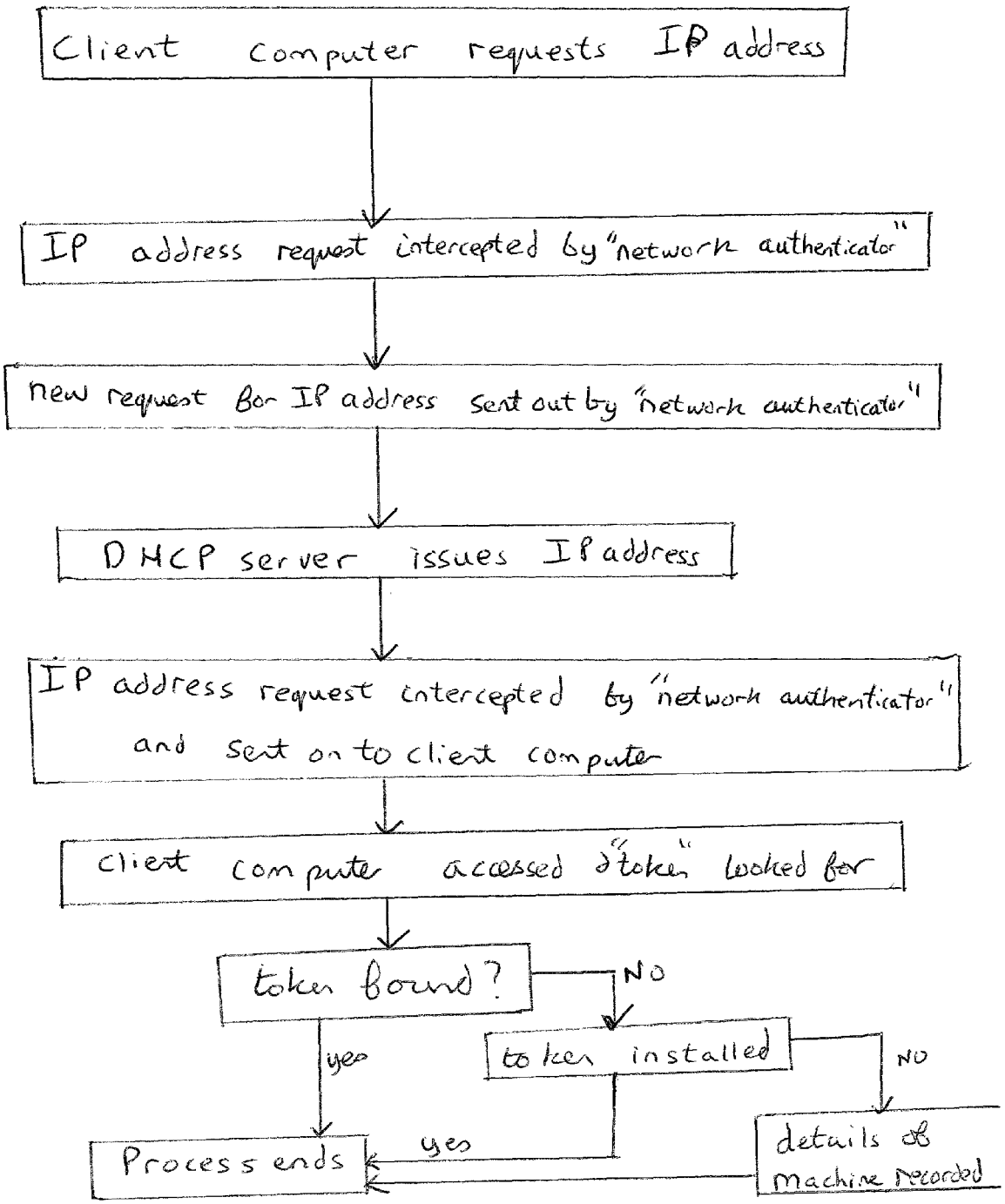
FIG. 3 is a flow diagram showing schematically a network authenticator intercepting and processing a request for a network connection.

FIG. 3 is a flow diagram showing an alternative embodiment. In this embodiment any IP request to a particular network's DHCP server(s) is intercepted by a "network access authenticator". This network access authenticator, may reside on the DHCP server itself or it may be on another server linked with the DHCP server via the network. The authenticator then itself requests an IP address from the DHCP server and on receiving the address, it passes it on to the client computer. The network access authenticator, then acts to check for the presence of a token on the client computer.

In one embodiment the token is the ePolicy Orchestrator agent which indicates the presence of McAfee anti virus software. This ePolicy Orchestrator agent uses a 64 bit PGP signature and it is this that is checked for. Thus, by checking for this token the network is able to ensure that no machine that is not suitably protected from viruses is allowed to connect to the network. If the software is found, then the process ends. If it is not found, then the network access authenticator attempts to install it on the client computer, this starts the process of that machine being protected. If it cannot install it then it creates an entry in the ePO tree (logged) of an "unmanaged machine", and it passes the IP address, user, domain and machine name to the operator. Alternatively, the network access authenticator may simply act to revoke the IP address and deny network access to the client computer.

FIG. 4 illustrates a general purpose computer 200 of the type that may be used to perform the above described techniques. The general purpose computer 200 includes a central processing unit 202, a read only memory 204, a random access memory 206, a hard disk drive 208, a display driver 210 with attached display 211, a user input/output circuit 212 with attached keyboard 213 and mouse 215, a network card 214 connected to a network connection and a PC computer on a card 218 all connected to a common system bus 216. In operation, the central processing unit 202 executes a computer program that may be stored within the read only memory 204, the random access memory 206, the hard disk drive 208 or downloaded over the network card 214. Results of this processing may be displayed on the display 211 via the display driver 210. User inputs for triggering and controlling the processing are received via the user input/output circuit 212 from the keyboard 213 and mouse 215. The central processing unit 202 may use the random access 206 as its working memory. A computer program may be loaded into the computer 200 via a recording medium such as a floppy disk drive or compact disk. Alternatively, the computer program may be loaded in via the network card 214 from a remote storage drive. The PC on a card 218 may comprise its own essentially independent computer with its own working memory, CPU and other control circuitry that can co-operate with the other elements in FIG. 4 via the system bus 216. The system bus 216 is a comparatively high bandwidth connection allowing rapid and efficient communication.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A computer program product comprising a computer program operable to control a server computer, said computer program comprising:
   (i) address provision logic operable to control said server computer to provide an address for accessing a network to a client computer, in response to a request for an address from said client computer;
   (ii) token validation logic operable in response to said provision of said address to control said server computer to contact said client computer at said address provided to said client computer and to detect a presence of a predefined token on said client computer;
   wherein said token validation logic is operable to control said server computer to check whether said detected predefined token is valid:
   wherein said token validation logic is operable to control said server computer to revoke said address from said client computer if said token is not detected or is not valid.

2. A computer program product as claimed in claim 1, wherein said token validation logic is operable to control said server computer to record machine data from said client computer if said token is not detected.

3. A computer program product as claimed in claim 1, wherein said token validation logic is operable to control said server computer to signal to said client computer that access has been denied if said token is not detected.

4. A computer program product as claimed in claim 1, wherein said predefined token indicates the presence of software allowing remote configuration of said client computer.

5. A computer program product as claimed in claim 4, wherein said token validation logic is operable to control said server computer to install said remote configuration software on said client computer if said token is not detected.

6. A computer program product as claimed in claim 1, wherein said predefined token indicates the presence of anti virus software on said client computer.

7. A computer program product as claimed in claim 1, wherein said server computer comprises a DHCP server and said address comprises an IP address.

8. A computer program product as claimed in claim 1, wherein said address provision logic is operable to control said server computer to request an address from a further server computer and to provide said address to said client computer.

9. A computer program product as claimed in claim 1, wherein said further server computer is a DHCP server and said address comprises an IP address.

10. A computer program product as claimed in claim 1, wherein said predefined token comprises a computer file or files.

11. A computer program product as claimed in claim 1, wherein said predefined token comprises a smart card.

12. A computer program product as claimed in claim 1, wherein said predefined token comprises data identifying a hardware component of said client computer.

13. A computer program product as claimed in claim 1, wherein said revoking of said address from said client computer results in a denial of network access for said client computer.

14. A computer program product as claimed in claim 1, wherein said token validation logic is further operable to identify details of said predefined token on said client computer, said details including at least one of an expiration date and a version number, and wherein said token validation logic is further operable to validate said details of said predefined token on said client computer.

15. A method of controlling a server computer, said method comprising the following steps:
   (i) providing an address for accessing a network from said server computer to a client computer, in response to a request for an address from said client computer;
   (ii) in response to said provision of said address, contacting said client computer with said server computer at said address to said client computer and detecting a presence of a predefined token on said client computer; and
   (iii) revoking said address from said client computer if said token is not detected or is not valid.

16. A method of controlling a server computer as claimed in claim 15, said method further comprising the step of checking whether said detected predefined token is valid.

17. A method of controlling a server computer as claimed in claim 15, said method further comprising the step of recording machine data on said server computer from said client computer if said token is not detected.

18. A method of controlling a server computer as claimed in claim 15, said method further comprising the step of signalling from said server computer to said client computer that access has been denied if said token is not detected.

19. A method of controlling a server computer as claimed in claim 15, wherein said predefined token indicates the presence of software allowing remote configuration of said client computer.

20. A method of controlling a server computer as claimed in claim 19 said method further comprising the step of installing said remote configuration software on said client computer if said token is not detected.

21. A method of controlling a server computer as claimed in claim 15, wherein said predefined token indicates the presence of anti virus software on said client computer.

22. A method of controlling a server computer as claimed in claim 15, wherein said server computer comprises a DHCP server and said address comprises an IP address.

23. A method of controlling a server computer as claimed in claim 15, said method further comprising the step of requesting an address from a further server computer and providing said address to said client computer.

24. A method of controlling a server computer as claimed in claim 23, wherein said further server computer is a DHCP server and said address comprises an IP address.

25. A method of controlling a server computer as claimed in claim 15, wherein said predefined token comprises a computer file or files.

26. A method of controlling a server computer as claimed in claim 15, wherein said predefined token comprises a smart card.

27. A method of controlling a server computer as claimed in claim 15, wherein said predefined token comprises data identifying a hardware component of said client computer.

28. A server computer comprising:
   an address provider operable to provide an address for accessing a network to a client computer, in response to a request for an address from said client computer;
   a token validator operable in response to said provision of said address to contact said client computer at said address and to detect a presence of a predefined token on said client computer;

wherein said token validator is operable to control said server computer to check whether said detected predefined token is valid;

wherein said token validator is operable to revoke said address from said client computer if said token is not detected or is not valid.

29. A server computer according to claim 28, wherein said token validator is operable to record machine data from said client computer if said token is not detected.

30. A server computer according to claim 28, wherein said token validator is operable to signal to said client computer that access has been denied if said token is not detected.

31. A server computer according to claim 28, wherein said predefined token indicates the presence of software allowing remote configuration of said client computer.

32. A server computer according to claim 31, wherein said token validator is operable to install said remote configuration software on said client computer if said token is not detected.

33. A server computer according to claim 28, wherein said predefined token indicates the presence of anti virus software on said client computer.

34. A server computer according to claim 28, wherein said server computer comprises a DHCP server and said address comprises an IP address.

35. A server computer according to claim 28, wherein said address provider is operable to request an address from a further server computer and to provide said address to said client computer.

36. A server computer according to claim 35, wherein said further server computer is a DHCP server and said address comprises an IP address.

37. A server computer according to claim 28, wherein said predefined token comprises a computer file or files.

38. A server computer according to claim 28, wherein said predefined token comprises a smart card.

39. A server computer according to claim 28, wherein said predefined token comprises data identifying a hardware component of said client computer.

40. A method of requesting an address from a server computer for a client computer, comprising the steps of:
    requesting an address from said server computer,
    receiving an address from said server computer;
    receiving a token validation request from said server computer at said address for said client computer;
    transmitting details of any token stored on said client computer to said server computer; and
    revoking said address from said client computer by said server computer if said token is not detected or is not valid.

41. A method as claimed in claim 40, said method further comprising the step of transmitting machine data about said client computer to said server computer in response to a request for said data from said server computer.

42. A method as claimed in claim 40, wherein said predefined token indicates the presence of software on said client computer allowing remote configuration of said client computer.

43. A method as claimed in claim 42, said method further comprising the step of installing said remote configuration software on said client computer from said server computer in response to said server computer not detecting said token.

44. A method as claimed in claim 40, wherein said predefined token indicates the presence of anti virus software on said client computer.

45. A method as claimed in claim 40, wherein said server computer comprises a DHCP server and said address comprises an IP address.

46. A method as claimed in claim 40, wherein said predefined token comprises a computer file or files.

47. A method as claimed in claim 40, wherein said predefined token comprises a smart card.

48. A method as claimed in claim 40, wherein said predefined token comprises data identifying a hardware component of said client computer.

* * * * *